United States Patent [19]

Hiller

[11] 4,363,166

[45] Dec. 14, 1982

[54] AUTOMATIC TOOL EXCHANGER

[75] Inventor: Norbert Hiller, Wendlingen, Fed. Rep. of Germany

[73] Assignee: Gebrueder Heller Maschinenfabrik GmbH, Nuertingen, Fed. Rep. of Germany

[21] Appl. No.: 179,019

[22] Filed: Aug. 18, 1980

[30] Foreign Application Priority Data

Sep. 3, 1979 [DE] Fed. Rep. of Germany ....... 2935523

[51] Int. Cl.³ .............................................. B73Q 7/00
[52] U.S. Cl. .................................................. 29/568
[58] Field of Search ................... 29/568, 26 A; 408/35

[56] References Cited

U.S. PATENT DOCUMENTS

| | | | |
|---|---|---|---|
| 3,300,856 | 1/1967 | Daugherty | 29/568 |
| 3,524,248 | 8/1970 | Durr et al. | 29/568 |
| 3,719,987 | 3/1973 | Seidel | 29/568 |
| 3,780,423 | 12/1973 | Lilienthal et al. | 29/568 |
| 3,837,070 | 9/1974 | Ochiai | 29/568 |
| 3,990,585 | 11/1976 | Johansson | 29/568 X |
| 4,122,597 | 10/1978 | Gusching et al. | 29/568 |

FOREIGN PATENT DOCUMENTS 4714870  6/1969  Japan .................................... 29/568

*Primary Examiner*—William R. Briggs
*Attorney, Agent, or Firm*—W. G. Fasse; D. H. Kane, Jr.; D. F. Gould

[57] ABSTRACT

The present machine tool is constructed for an automatic tool exchange and includes a double column (11, 12) in which a spindle unit (15) and a tool magazine (22) are separately guided for moving jointly. A grapple claw mechanism includes an angular double claw. These features satisfy the hitherto contradictory requirements for a minimal idle time for the tool exchange and for a high machining accuracy by the elimination, among others, of the positioning tolerance.

4 Claims, 4 Drawing Figures

AUTOMATIC TOOL EXCHANGER

BACKGROUND OF THE INVENTION:

The invention relates to a machine tool with an automatic tool exchange. More specifically, the invention relates to so-called multiple tool automatic machining centers.

Such machine tools are known, for example, from German Pat. No. 1,552,324 corresponding to U.S. Pat. No. 3,524,248. This known machine has primarily three drawbacks. The tool magazine is mounted on the spindle unit, whereby vibrations may be transmitted to the spindle so that the machining accuracy is impaired. These vibrations result when the tool selection motion of the magazine must take place very rapidly whereby large braking and accelerative forces occur. Therefore, when a high machining accuracy is required, no rapid magazine movements should take place during the machining time. Depending on the position of the next tool to be exchanged in the spindle, a more or less large, but always disturbing idle time results. In this known machine, the grapple claw mechanism comprised two individual grapple claws driven in opposite directions so that the actual tool exchange operation also took too much time for today's requirements. Finally, a practically unjustifiable increase in cost may have been caused by the restriction on the size of the magazine by the space between the two vertical columns. Either the magazine would have to be very small or the spacing between the two columns would have to be chosen to be larger than necessary for other considerations thereby causing said cost increase.

However, the just mentioned machine tool also has essential advantages compared to other known comparable machine tools. Due to the double column frame construction, a very high machining accuracy is guaranteed, in principle, because any thermal expansion in the x-axis takes place symmetrically relative to the spindle and is thus compensated without any adverse effect. Furthermore, the working space, that is the space in front of the spindle which may be occupied by the work piece, is only minimally restricted, because the tool in its initial exchange position is located completely behind the front contour of the entire machine, so that the work piece may project, theoretically in any case, up to the spindle unit or rather to the column until shortly after the start of the actual tool exchange operation, namely, practically in the entire outer field or zone of the spindle. Finally, the tool exchange may take place in any position of the spindle unit, even in the lowest position, which achieves substantial time savings. Also, it is possible, by these means, to nullify the positioning tolerance when multiple machining operations take place in the same position, which is especially important for coaxial machining operations, for example for graduated borings in the work piece, because a very good coaxiality may be guaranteed in this way.

There is no prior art machine tool of a comparable type which avoids all the drawbacks of the described, known machine tool while simultaneously retaining all the advantages.

The term "machining center" has been introduced to describe machine tools of this and comparable types. A good review of the different forms of known machining centers is set forth in the periodicals "Technische Zeitschrift fuer praktische Metallbearbeitung" (Numerik) 63 (1969), Nr. 6 (2, 1969 H 6), pages 318(50) to 334(66) and "Werkstatt und Betrieb" 102, 1969, Nr. 7, pages 487 to 493. In "Numerik", page 317, right column, section 2, paragraph 1, it is explicitly pointed out that the embodiment of these processing machines in the year 1969 are very diversified despite often having identical goals or objectives. Such diversification is not present in conventional machines and is a typical indication that an ideal form or at least an optimal form of a machining center has not yet been developed. An ideal machine form is naturally understood to be a machine which avoids the disadvantages of other machines, but exhibits their advantages while an optimal machine is understood to have only those unavoidable disadvantages that must be taken into account to attain the desired advantages.

After publication of said review another series of machining centers has become known, for which these considerations apply unchanged. Thus, in the small machining center BEA 1-H, the applicant abandoned the double column frame construction method, so that the tool magazine could be constructed substantially larger. By using an angular double grapple claw, the tool exchange time has been substantially reduced as compared to oppositely moving individual grapple claws.

Simultaneously, the advantage of executing the tool exchange in each and any position of the spindle unit has been maintained.

Due to the advantages of the double column frame construction, many different machining centers have become known which were based on the underlying principle of the broad pendant construction. The tool magazine is arranged on one side of the double column frame in known machines of this type and an angular double grapple or gripping claw is provided as an exchanging mechanism (DIAG Werner Transfer-Center TCI; Deckel High Performance Machining Center S500). The spindle unit must move into a tool exchange position in this type of construction so that the advantages mentioned above must be relinquished, namely time savings due to tool exchange in each spindle position and the elimination of the positioning tolerance. Additionally, the exchange position must be located in the upper range of the y-direction displacement of the main spindle so that long tools, which necessarily tip downwardly upon insertion or removal out of the spindle by the angular double grapple claw, may by-pass the work piece table, so that in many cases traversing into the exchange position and back to the machining position requires a considerable time.

In another known machining center with a double column frame, please see German Patent Publication No. 2,808,796, the traverse path is shortened somewhat by the use of a single double grapple claw, but at the expense of an involved grapple claw construction in which the complete exchange operation takes up a considerable amount of time. In addition, the tool projects into the work space when it is in a position in which it can be grabbed by the double grapple claw.

The tool in another known machining center (Kearney and Trecker Marvin Ltd. KTM400) with a double column frame, is also brought into an exchange position corresponding to the uppermost position of the spindle unit by means of two intermediate grapple claws, and the tool is exchanged into the spindle by means of a single double grapple claw out of said uppermost position. This type of structure has the disadvantages of locating the tool exchange position at the upper end of the y-displacement and of a single double grapple claw having an involved claw construction.

Another known machining center with a double column frame is also provided with a single double grapple claw. The magazine is secured on the upper side of the double column, please see German Patent Publication No. 2,001,871. The tool spindle must also move into an exchange position in the upper range of the y-displacement in this machining center. Moreover, the tools in this known machining center project into the work space at all times and not only during the initial exchange position, whereby naturally it must be taken into account that the work space may easily extend upwardly above the machine tool itself. This may occur when only the lower area of a high or long work piece must be processed or machined. The foregoing may naturally also be achieved in that larger work pieces are reclamped on the work piece support.

A further known machining center with a double column frame made by Hueller Hille, Horizontal Machining Center nb-h 80-1 and nb-h 100-1, is again provided with a single double grapple claw, but the magazine is arranged freely next to the double column. Here again, the spindle unit must be moved into an exchange position, in the middle of the y-displacement. In addition, the entire double column must traverse to the rearward end of the z-displacement, so that even in a more favorable tool exchange machining position in the y-direction, a noticeable time loss results.

German Patent Publication No. 1,949,390 corresponding to U.S. Pat. No. 3,837,070 discloses a machining center in which the double column construction has been abandoned and in which the tool magazine is arranged on one side and the spindle unit is arranged on the other side of a single standard or column. The magazine is located above the spindle and an intermediate grapple claw is provided which takes a tool, to be exchanged in the spindle, out of the magazine and brings the tool into an initial exchange position from where it can be exchanged on the tool spindle by means of a single double grapple claw. The work space next to the spindle is free in this known machining tool yet the upper end of the spindle is not free. Besides, the advantages of the double column frame construction cannot be achieved by this structure.

German Patent Publications Nos. 1,477,347 and 1,477,358 corresponding to U.S. Pat. No. 3,300,856 disclose how in processing centers with a single column the tool magazine is arranged on the spindle tool carrier on the back part of the spindle unit and the tools are transported into the initial exchange position by means of an intermediate grapple claw in the form of a double grapple claw. The tool is then exchanged directly into the spindle from the intermediate position. In these machines, the tool also projects into the work space in the initial exchange position, the advantages of the double column construction have been abandoned, and the magazine is mounted on the spindle unit with the disadvantages mentioned above.

OBJECTS OF THE INVENTION

In view of the foregoing it is the aim of the invention a achieve the following objects singly or in combination:

to minimize the duration of idle times caused by a tool exchange in any spindle position;

to avoid positioning tolerances, in other words, to avoid causing machining tolerances due to movements required for the exchange of a tool for another tool;

to minimize the distances to be traversed by the machine tool components, especially in the z-direction which is the feed advance direction of the tool or tools;

to keep the work space and the space about the spindle means as free of other components as possible;

to maintain substantially all the advantages of a double column frame machine tool;

to avoid temperature or heat expansions in the direction of the x-axis which is the axis along which the entire machine tool frame may be displaced relative to a machine bed;

to avoid transmitting to the spindle vibrations caused by the rotation of the tool magazine; and to permit a tool exchange in any position of the spindle unit even while the latter is being displaced.

SUMMARY OF THE INVENTION

According to the invention there is provided a machine tool with an automatic tool exchange comprising a double column frame supporting a horizontally displacing spindle unit on respective guide means. The double column frame also supports a separate tool magazine to separately locate the tool magazine with a constant spacing relative to the spindle means and above the spindle means. Thus, the spindle means and the tool magazine means are independently supported, but the displacement drive means are operatively connected to the spindle means and to the tool magazine means for moving the spindle means and the separate tool magazine means in unison. A grapple or gripping claw mechanism is operatively arranged on the horizontal spindle means or unit for swinging a tool in the spindle axis. The tool magazine is guided in a zone of the double column frame remote from the spindle unit and the grappling or gripping claw means comprise a so-called angular double grapple claw.

Thus, according to the invention, one starts from the above first mentioned known machine tool according to German Pat. No. 1,552,324, because it has been found, surprisingly that just this machine is amenable or at best suited to modifications for solving the problems set forth above.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
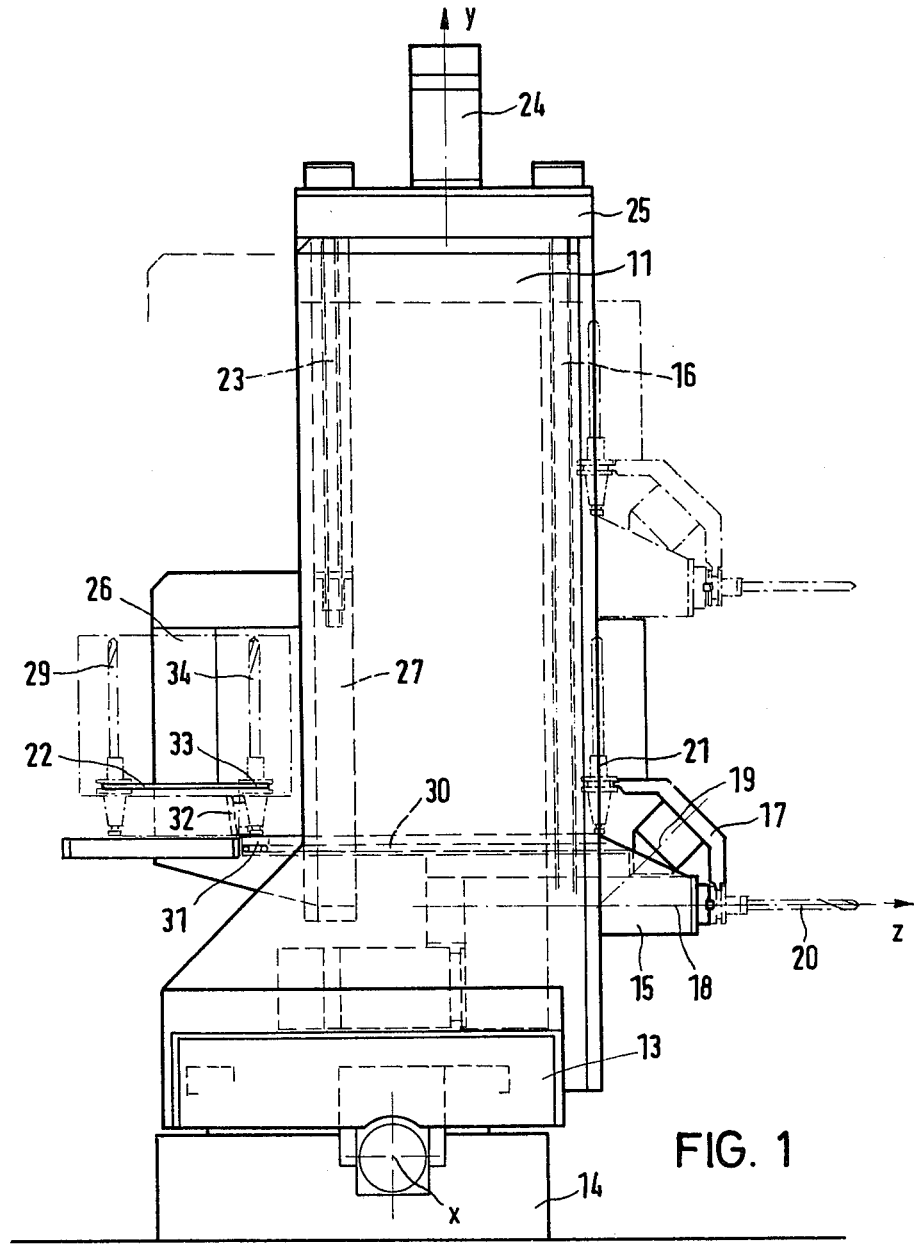
FIG 1 is a side view of the preferred embobiment of the invention, wherein the x-direction extends perpendicularly into the plane of the drawing sheet, the y-direction extends upwardly in the plane of the drawing sheet, and the z-direction is the feed advance direction of the operating tool.
Figure 2:
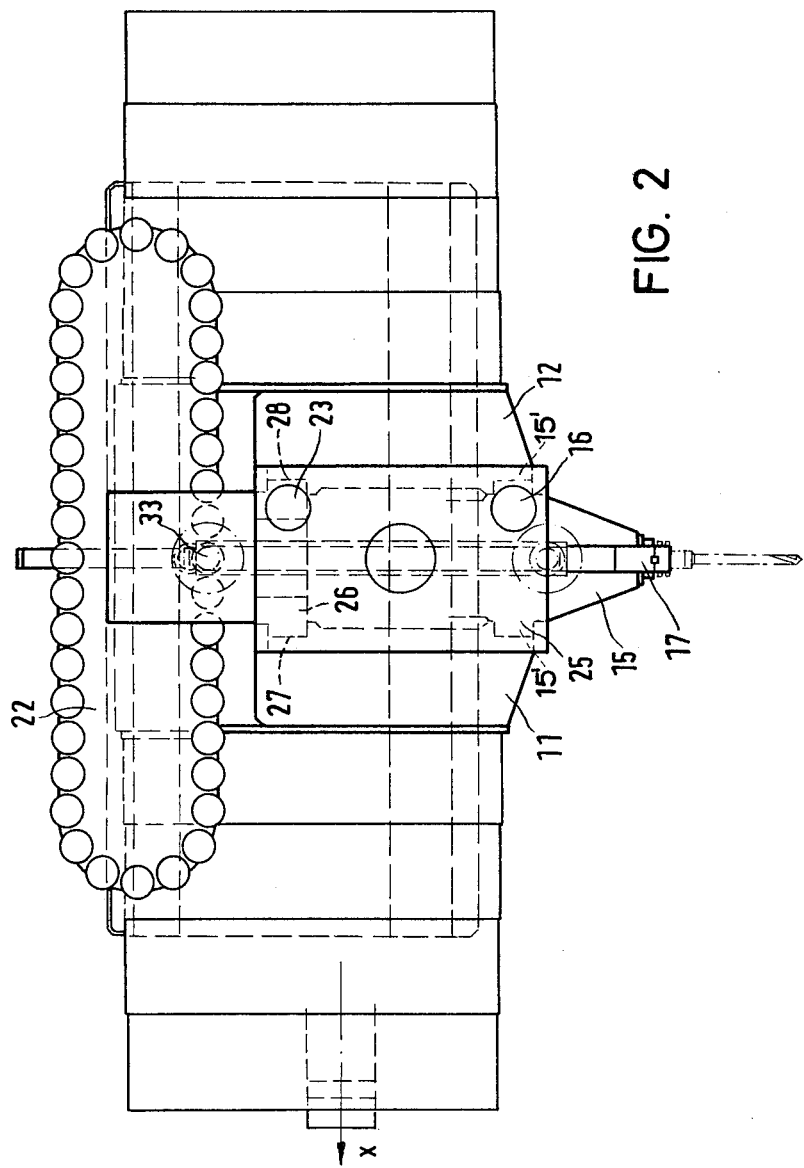
FIG. 2 shows a top view onto the embodiment according to FIG. 1 in the y-direction.

The machine tool shown in FIGS. 1 and 2 comprises two vertical columns or standards 11 and 12 forming a so-called broad pendant which, in the shown embodiment, is arranged on a sled or carriage 13. The sled 13 is slidable in the x-direction on the machine bed 14. This slidability in the x-direction can be omitted if the work piece table (not shown) is slidable in this direction.

A spindle unit 15 is located between the two columns 11 and 12 and is movably guided by first guide means 15′ to move upwardly and downwardly in the y-direction. A ball roller spindle 16 is operatively connected to the spindle unit 15 as a drive for moving the spindle unit up and down. The spindle unit 15 is shown by dash-dotted lines in an upper position in FIG. 1. An angular double grapple claw 17 is arranged on the spindle unit 15 in such a way that it exchanges a tool 20, shown by phantom lines, in the spindle, by a tool 21 also indicated by phantom lines, located above the spindle in the initial exchange position extending perpendicularly to the spindle axis 18. The exchange is accomplished by rotating the claw 17 about an axis 19 which extends at an angle of 45° to the spindle axis 18. The assembly and mode of operation of such an angular double grapple claw are known.

A tool magazine 22, guided to move up and down parallel to the spindle unit 15, is located in that section of the double column frame 11 and 12 facing away from the part of the spindle unit 15 which carries or receives the tool 20. A ball roller spindle 23 is provided as a drive for moving the magazine 22 up and down. Both ball roller spindles 16 and 23, in the shown embodiment, are driven in unison by a common driving motor 24 which is arranged on a plate or yoke 25 covering and rigidly interconnecting both columns 11 and 12. Two separate driving motors may also be provided, instead of the shown embodiment, which are driven in the same direction so as to move the spindle unit 15 and the tool magazine 22 up and down in synchronism so that the spatial relationship between the tool magazine 22 and the spindle unit 15 remains constant. As best seen in FIG. 2, the magazine 22 in the shown embodiment is a chain magazine, which is held by a bracket 26 located outside of the columns 11 and 12 on the side facing away from the angular double grapple claw 17. The bracket 26 is driven by the above mentioned ball roller spindle 23 and is guided along second guideways 27, 28 in the columns 11 and 12. The tools such as shown at 29 in the tool magazine 22 stand perpendicularly to the spindle axis 18.

The chain magazine 22 may be replaced by a plate magazine without necessitating any substantial structural changes. Chain magazines as well as plate magazines are known. It is also known that plate magazines may be automatically interchanged to enlarge the selection of tools. Therefore, more detailed explanations are not necessary for the expert.

A guideway 30 is provided underneath the tool magazine 22 and above the spindle unit 15 which stretches from the tool magazine 22 to the angular double grapple claw 17 in which a sled or carriage 31 is guided. The sled 31 carries an intermediate grapple claw 32. The intermediate grapple claw 32 is used to transfer the tool 34 from the position 33 of the magazine 22 into the initial exchange position so that the tool 34 can assume the position of the tool 21 and the tool 21 is transferred back into the magazine position labeled 33. The assembly and mode of operation of such intermediate grapple claws are known by the expert and therefore do not need to be explained further.

The machine according to FIGS. 1 and 2 satisfies all of the requirements established above. The tool exchange is possible in any position of the spindle unit 15. Additionally, the tool exchange may even occur while the spindle unit 15 is travelling to the next working position, and even during rapid traverse. The tool 21 in the initial exchange position does not extend into the work space, that is, the space next to, under, and above the spindle is normally free thereby allowing the work piece to project into this space. A free space is only necessary during the actual exchange operation. This free space is normally already assured since the tool which hitherto engaged the work piece must be pulled out of the work piece, or rather, the work piece must be pulled back from the machine by movement in the z-direction which may be accomplished by the processing unit and/or by the work piece or rather by the work piece support according to working conditions. The advantages of the double column construction are retained. Vibrations caused by a magazine motion cannot be transmitted to the spindle unit 15, since such double column frames must be originally constructed in such a way that the transmission of vibrations is avoided. The exchange time is extremely short. As is well known, the shortest possible exchange time is achieved by means of an angular double grapple claw, since removing the hitherto used tool and exchanging it with the next following tool occurs simultaneously and especially in the angular double grapple claw, the arms and therefore the centrifugal forces can be kept particularly small.

In the special case in which several tools sequentially carry out machining operations of short duration, the time required for the transport of an exchanged tool back to the magazine and the next tool into the initial exchange position, may become so large that it extends the idle period. When this very rare case is to be taken into account, the invention may be modified or constructed according to FIG. 3.

Figure 3:
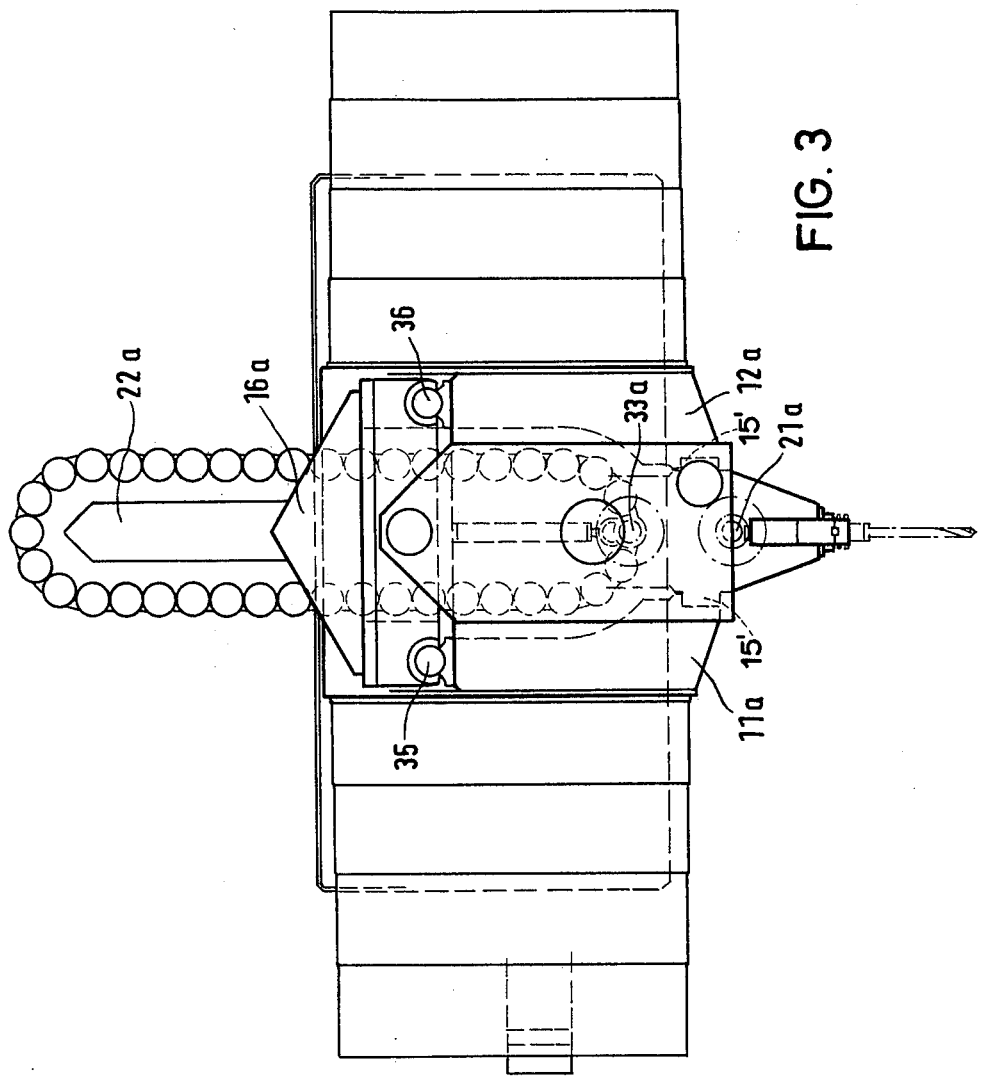
FIG. 3 is a top view as in FIG. 2, but showing a second embodiment of the invention.

The embodiment shown in FIG. 3 differs from the embodiment of FIG. 1 essentially only in that the tool magazine 22a extends through the free space between the two columns 11a and 12a into the vicinity of the initial exchange position 21a, so that the distance between the magazine position 33a and the initial exchange position 21a is made smaller. An intermediate grapple claw, corresponding to the intermediate grapple claw 32 of the embodiment according to FIGS. 1 and 2, is still necessary. However, the intermediate claw of FIG. 3 needs to cover only a very short path, so that the necessary time is substantially reduced without giving up the advantages of an interemdiate grapple claw, namely, the possibility to make do with a simple magazine position coding instead of the essentially more expensive or more involved tool coding. Further, the embodiment according to FIG. 3 also differs from the embodiment according to FIGS. 1 and 2 in that the magazine 22a is carried by a sled 16a which is guided in circular second guideways 35, 36 which are mounted on the back side of the columns 11a and 12a. Flat guideways could basically also be used on the inner side of the columns 11a, 12a. Conversely, circular guideways could be used on the back side of the columns of the embodiment according to FIGS. 1 and 2, in which case, however, the magazine 22 would have to move correspondingly further out.

Figure 4:
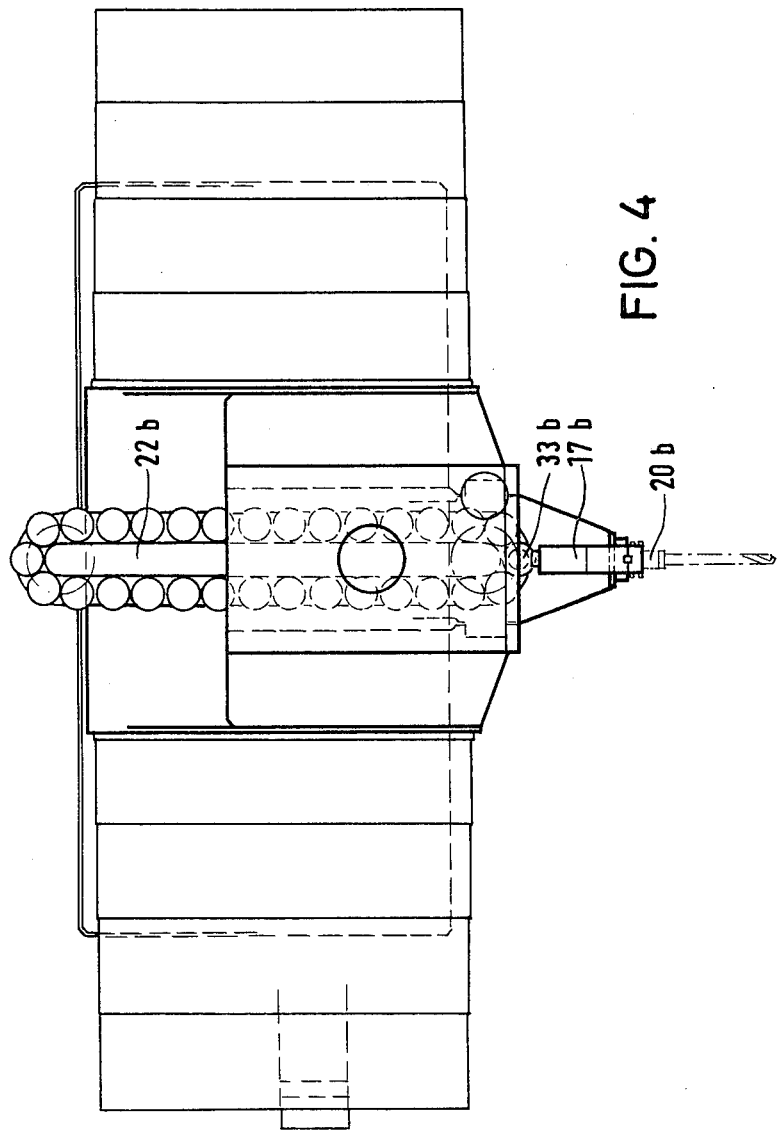
FIG. 4 is a top view as in FIG. 2, but showing a third embodiment of the invention.

Instead of the previous forms, an embodiment according to FIG. 4 may also be selected, in which the intermediate grapple claw has been obviated altogether.

In the first approximation, the tool magazine 22b of this embodiment is arranged similarly to the tool magazine 22a of the embodiment according to FIG. 3, but in FIG. 4 the magazine 22b extends up to the initial exchange position so that the initial exchange position and the corresponding magazine position 33b coincide with each other. The angular double grapple claw 17b of this embodiment grabs the tool in the magazine position 33b directly and exchanges it with the previously engaged tool 20b. In this embodiment, however, a tool coding is indispensable, since after the exchange operation the previously engaged tool is necessarily located in the magazine position previously occupied by the exchange tool that is engaged from that time on. It is to be understood that "tool coding" in this context may include time markings on the tools as well as tracking of the magazine position reservation by the machine control means.

Although the invention has been described with reference to specific example embodiments, it is to be appreciated, that it is intended to cover all modifications and equivalents within the scope of the appended claims.

What is claimed is:

1. A machine tool with an automatic tool exchange, comprising frame means including two upright columns (11, 12), yoke means (25) rigidly interconnecting said columns substantially at the top of the columns to rigidly hold said columns at a predetermined spacing from each other, said columns defining a central vertical plane extending substantially centrally through both upright columns, horizontal spindle means (15) movably located in said spacing between the upright columns (11, 12) and having a spindle axis (18) extending horizontally and perpendicularly to said central vertical plane, said spindle axis (18) extending from said columns on one side of said frame means, first guide means (15') operatively mounted in said frame means adjacent to said one side of said frame means for guiding said spindle means (15) in its up and down movement centrally in said spacing along said one side of said frame means, separate tool magazine means (22), magazine support means (26) for movably mounting said separate tool magazine means to said frame means above said spindle means and in a constant spacial relationship to said spindle means but independently of said spindle means, said tool magazine means holding tools in a direction extending perpendicularly to said spindle axis (18), second guide means (27, 28; 35, 36) operatively mounted in said frame means substantially opposite said first guide means (15) adjacent the other side of said frame means opposite said one side of said frame means for guiding said magazine support means and with it the tool magazine means (22) so that the spindle means (15) and the magazine support means are both guided by both columns, grapple claw means (17) including an angular double claw operatively arranged on said horizontal spindle means (15) for swinging a tool into said spindle axis (18), drive means (16, 23, 24) operatively connected to said horizontal spindle means and to said magazine support means for moving said spindle means (15) and said tool magazine means (22) in unison, and wherein the tools are supplied to said spindle means through said spacing.

2. The machine tool of claim 1, wherein said grapple claw means comprise intermediate claw means and further guide means extending from said tool magazine means to an initial tool exchange position above the spindle means, said further guide means operatively supporting said intermediate claw means.

3. The machine tool of claim 1 or 2, wherein said tool magazine means comprise a chain magazine.

4. The machine tool of claim 1, wherein said horizontal spindle means comprise spindle carrier means and means operatively supporting said grapple claw means on said spindle carrier means.

* * * * *